US008751395B2

(12) United States Patent
Fulton et al.

(10) Patent No.: US 8,751,395 B2
(45) Date of Patent: Jun. 10, 2014

(54) VERIFICATION METHODS FOR FRAUD PREVENTION IN MONEY TRANSFER RECEIVE TRANSACTIONS

(75) Inventors: Keith Fulton, Dallas, TX (US); Chris Van Matre, Lino Lakes, MN (US); Billy Joe Steiger, Jr., Ovilla, TX (US); Eric J. Sander, Mendota Heights, MN (US); Olakunle H. Olamuyiwa, Lagos (NG); Georgina Essah, Johannesburg (ZA)

(73) Assignee: MoneyGram International, Inc., Dallas, TX (US)

( * ) Notice: Subject to any disclaimer, the term of this patent is extended or adjusted under 35 U.S.C. 154(b) by 68 days.

(21) Appl. No.: 12/849,543

(22) Filed: Aug. 3, 2010

(65) Prior Publication Data

US 2012/0036071 A1    Feb. 9, 2012

(51) Int. Cl.
*G06Q 40/00*    (2012.01)
(52) U.S. Cl.
USPC .................................. 705/44; 705/38; 705/39
(58) Field of Classification Search
USPC ........................................................... 705/44
See application file for complete search history.

(56) References Cited

U.S. PATENT DOCUMENTS

| 7,461,776 | B2 | 12/2008 | Steiger, Jr. | |
| 2006/0253340 | A1* | 11/2006 | Levchin et al. | 705/26 |
| 2008/0015989 | A1* | 1/2008 | Steiger | 705/44 |
| 2008/0167989 | A1* | 7/2008 | Conlin et al. | 705/44 |
| 2009/0106149 | A1* | 4/2009 | Bennett et al. | 705/42 |

FOREIGN PATENT DOCUMENTS

WO    WO0067177 A2    11/2000

OTHER PUBLICATIONS

International Search Report and Written Opinion issued in PCT/US2000/011732, mailed Jan. 20, 2012.

* cited by examiner

*Primary Examiner* — Hai Tran
(74) *Attorney, Agent, or Firm* — Faegre Baker Daniels LLP (57) ABSTRACT

A computer system is operated to prevent fraud in a money transfer receive transaction. A send transaction request is received from a sender for a money transfer including a send amount. The sender is prompted to select one or more security inputs to be supplied by a receiver for redemption of the money transfer. A send transaction record is stored with the selected one or more security inputs in a server. A receive transaction request is then received from the receiver. The receiver is prompted for the one or more security inputs set for redemption of the money transfer, and the provided one or more security inputs from the receiver are received. The received one or more security inputs are authenticated, and release of funds in the send amount is authorized if the received one or more security inputs are authenticated.

25 Claims, 4 Drawing Sheets

VERIFICATION METHODS FOR FRAUD PREVENTION IN MONEY TRANSFER RECEIVE TRANSACTIONS

TECHNICAL FIELD

The present invention relates to computer systems for money transfers. More particularly, the present invention is a computer system including verification methods for fraud prevention.

BACKGROUND

A number of businesses offer money transfer and other services through a network of agents. A customer that desires to use these services to transfer money to a third party can take the money to an agent of the money transfer service. The agent accepts the money, obtains necessary information such as the customer's identity and the identity of the receiver, and initiates a transaction. The money is then made available to the receiver by another agent.

Many countries have laws and regulations (compliance requirements) relating to money transfer and similar activities. These regulations often specify limits on the nature and amount of transactions, the types of information that must be collected in connection with these activities, and associated reporting requirements. For example, a country may have a rule in place that stipulates that an individual may only send or receive a specific amount of money in a year, or that businesses providing money transfer services must report how much money was transferred by a consumer out of the country during the course of the year. In addition, some countries may require collection of additional information such as a phone number or birthdate. These compliance requirements can vary with a variety of factors such as the country where the transfer originates, the country to which funds are being transferred, the amount of the transfer, and the number of transfers by the customer.

SUMMARY

In one aspect, the present invention relates to operating a computer system to prevent fraud in a money transfer receive transaction. A send transaction request is received from a sender for a money transfer including a send amount. The sender is prompted to select one or more security inputs to be supplied by a receiver for redemption of the money transfer. Information related to the money transfer is stored with the selected one or more security inputs in a server. A receive transaction request is then received from the receiver. The receiver is prompted for the one or more security inputs set for redemption of the money transfer, and the provided one or more security inputs from the receiver are received. The received one or more security inputs are authenticated, and release of funds in the send amount is authorized if the received one or more security inputs are authenticated.

In another aspect, the present invention relates to a system configured to prevent fraud in a money transfer receive transaction. The system includes a server that communicates with a plurality of computers. The server receives a send transaction request for a money transfer from a sender including a send amount. The server also receives one or more security inputs selected by the sender to be supplied by a receiver for redemption of the money transfer. The server stores information related to the money transfer with the selected one or more security inputs. Subsequently, the server receives a receive transaction request from a receiver of the money transfer, and also receives the one or more security inputs from the receiver. The received one or more security inputs are authenticated by the server, and the server authorizes release of funds in the send amount if the received one or more security inputs are authenticated.

In a further aspect, the present invention relates to operating a computer system to prevent fraud in a money transfer receive transaction. A receive transaction request is received from a receiver computer for redemption of the money transfer. A server retrieves information associated with the money transfer including one or more security inputs that are selected by a sender and are to be entered by the receiver for redemption of the money transfer. Information requesting the one or more security inputs is then transmitted to the receiver computer. The one or more security inputs are received from the receiver computer, and the received one or more security inputs are compared to the information associated with the retrieved money transfer. An electronic release approval is transmitted to the receiver computer to release funds in an amount of the money transfer if the received one or more security inputs correspond to the retrieved information associated with the money transfer.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1:
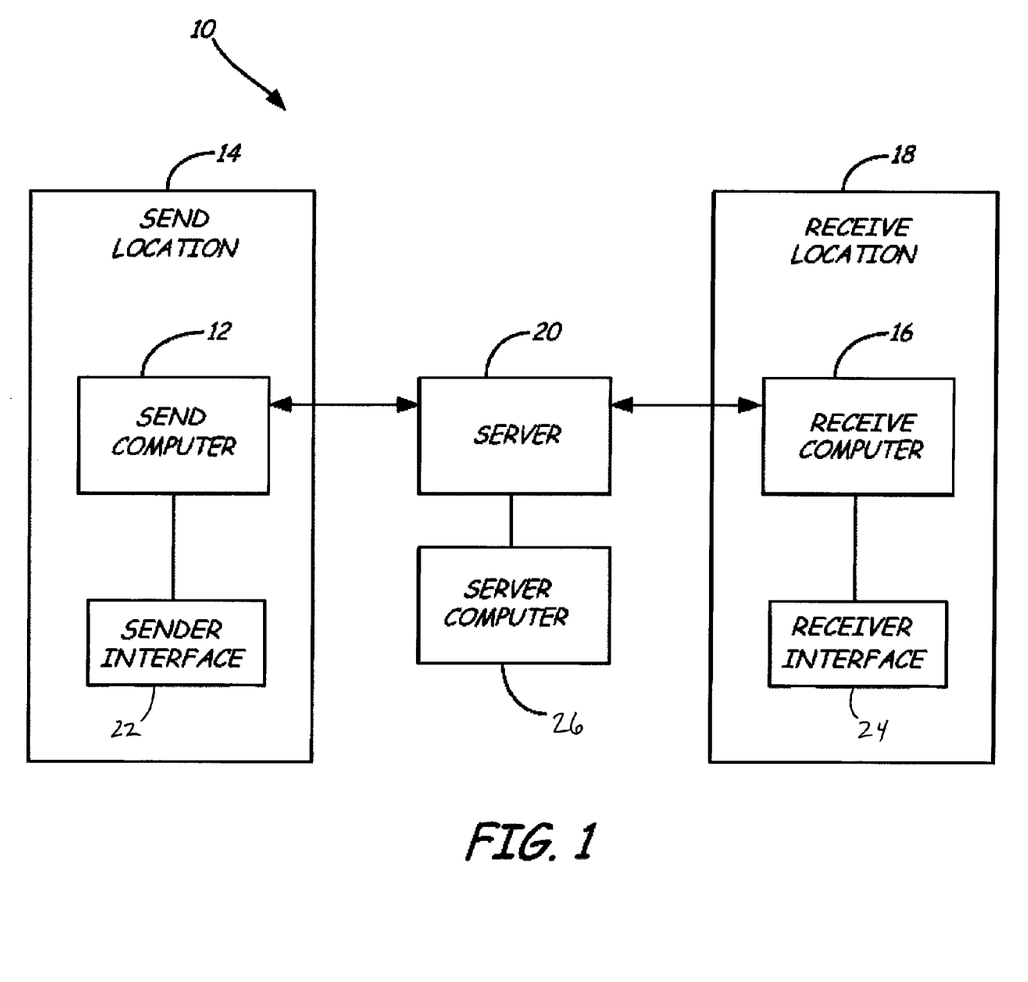
FIG. 1 is a block diagram of an embodiment of a system for preventing receiver side fraud transactions.

FIG. 1 is a block diagram of an embodiment of a system 10 for sending and receiving money transfers. System 10 includes a send computer 12 at a send location 14 and a receive computer 16 at a receive location 18. The send computer 12 and the receive computer 16 communicate with a central server 20, for example via a communication network such as the internet. In some embodiments, a sender interface 22 is connected to the send computer 12, and a receiver interface 24 is connected to the receive computer 16. As will be described in more detail herein, the system 10 facilitates the sending of money transfers through the send computer 12, and the receipt of the money transfer through the receive computer 16. One or more security measures are associated with the money transfer to minimize or prevent fraud on the receiver side of the money transfer (e.g., at the receive location 18). The server 20 coordinates the requesting and approval processes for the sending and receiving of the money transfers.

The send location 14 may be a facility that is approved by a financial services organization to send purchase requests for money transfers to the server 20. The send location 14 may be a store or dedicated location that provides redemption services for money transfers. Alternatively, the send location 14 may access a computer remotely, such as via a telephone call or the internet. The send computer 12 is operated by an agent at the approved send location 14. The send computer 12 may include software that facilitates entry of information to request sending the money transfer for subsequent transmission to the server 20 for approval. The agent at the send location 14 may also review purchaser identification and accept funds from the sender of the money transfer. In some embodiments, the agent accepts funds on behalf of the financial services organization. The send location 14 may also include a telephone (not shown) or other voice communications device to contact the financial services organization if questions arise during the money transfer request process. While a single send location 14 is shown in FIG. 1, in actual implementation, the system 10 includes a plurality of send locations 14 that each includes a send computer 12 that communicates with the server 20.

In alternative embodiments, the send computer 12 may be any computer configured to provide information to the server 20 via a secure internet or server connection. For example, the send computer 12 may be a home computer, kiosk, or other interactive device. The send computer 12 may include a web browser or other application that provides a user interface to enter information to send a money transfer. The web browser may allow for entry of sender identification information and sender account information, the latter of which authorizes withdrawal of funds from an account with a financial institution to fund the money transfer. As another example, the send computer 12 may be configured to receive money transfer send information from the sender via telephone or interactive voice recognition systems. As a further example, a telephone at the send location 14 may be used to contact a call center (not shown) to initiate a send request to the server 20.

The receive location 18 may be a facility that is approved by the financial services organization to provide redemption requests for sent money transfers to the server 20 and issue funds to money transfer receivers upon approval of the redemption requests. The receive location 18 may be a store or dedicated location that provides redemption services for money transfers. Alternatively, the receive location 18 may access a computer remotely, such as via a telephone call or the internet. The receive computer 16 at the receive location 18 may be operated by an agent at the approved receive location 18. The receive computer 18 may include software that facilitates entry of information to request redemption of money transfers for subsequent transmission to the server 20 for approval. The agent at the receive location 18 also, in some cases, reviews the identification of the money transfer receiver and, if approved, issues funds to the money transfer receiver. The receive location 18 may also include a telephone or other voice communications device to contact the financial services organization if questions arise during the money transfer receipt process. While a single receive location 18 is shown in FIG. 1, in actual implementation, the system 10 includes a plurality of receive locations 18 that each include a receive computer 16 that communicates with the server 20.

The server 20 may be housed and/or operated by or on behalf of the financial services organization that, among other functions, approves and coordinates send transactions of money transfers at the send location 14 and receive transactions of money transfers at the receive location 18. The server 20 facilitates approval of send requests from the send location 14 and receive requests from the receive location 18. In some embodiments, the server 20 is configured to process send and receive requests automatically. In other embodiments, the server 20 provides information to a user at the financial services organization for review and approval. For example, the server 20 may be connected to a computer 26 that provides an interface to a user at the financial services organization to review and approve or deny money transfer send or receive transactions. The server 20 includes storage capabilities to store information from money transfer send transactions for later retrieval during the money transfer receive approval process. In addition, the server 20 may store other information such as, for example, past customer money transfer send/receive activity, customer account information, and computer identification and log-in information for the send computer 12 and receive computer 16.

As will be described in more detail herein, the system 10 incorporates one or more security features that minimize or prevent fraud in transactions at the receive locations 18. For example, in some embodiments, the send computer 12, in cooperation with the server 20, allows the sender of a money transfer to select one or more security inputs to be required of the receiver of the money transfer to redeem the money transfer. As another example, in some embodiments, the receive computer 16, which may be a kiosk or other self-service system, prompts the receiver of the money transfer to enter information about the money transfer (e.g., reference number and money transfer amount) and to swipe or scan a card or identification including identifying information about the receiver. As a further example, in some embodiments, when a money transfer is retrieved from the server 20 and viewed at a receive location 18, the receive transaction is locked to that receive location 18, and may not be received at any other receive locations 18.

Figure 2:
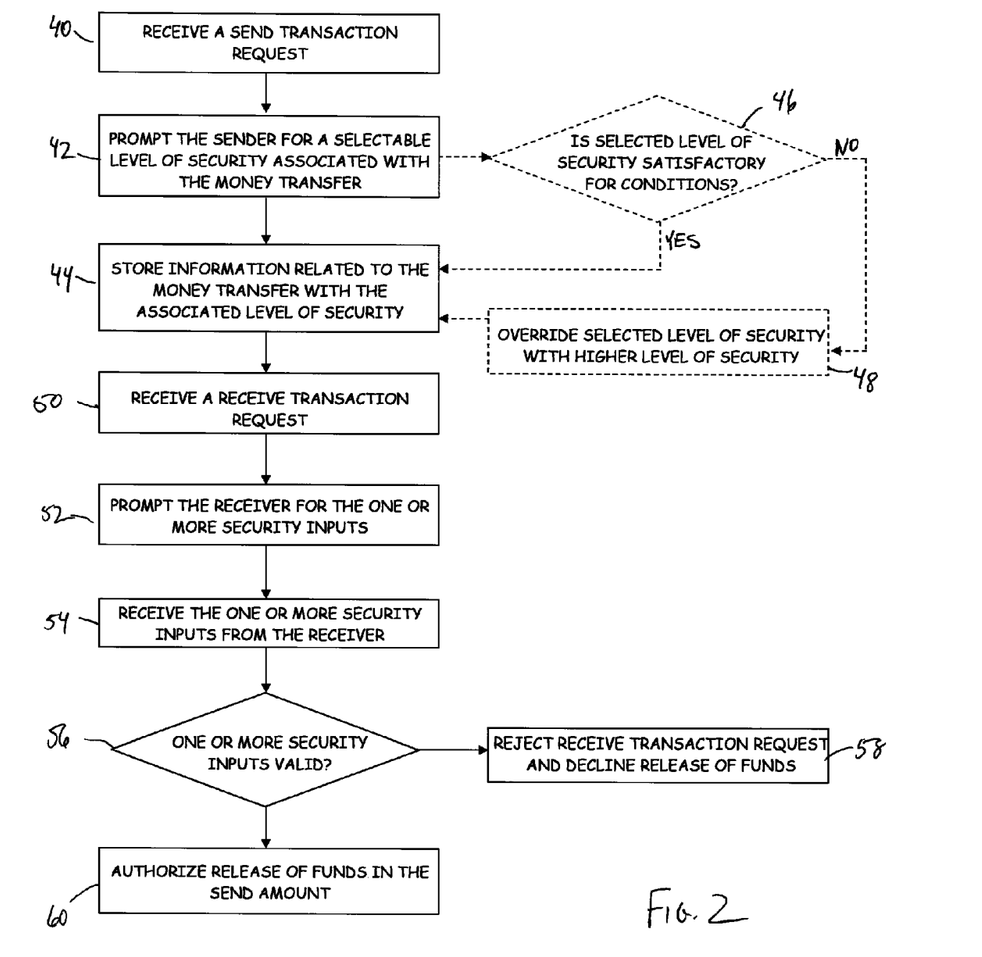
FIG. 2 is a flow diagram of an embodiment of a process for allowing the sender of a money transfer to set one or more security inputs required to receive the money transfer.

FIG. 2 is a flow diagram illustrating an embodiment of a process for allowing the sender of a money transfer to set security inputs to be entered by the money transfer receiver to release the transferred funds. In step 40, the server 20 receives a money transfer send request from the send location 14. The money transfer send request may include information such as sender identification information, the amount of the money transfer, sender funding source information, receiver identification information, and information about the receive location 18. In some embodiments, the send transaction request includes a staging element and a fulfillment or finalizing element as described in, for example, U.S. Pat. No. 7,461,776, which is hereby incorporated by reference in its entirety. When the server 20 receives the send transaction request, the server 20 processes the data associated with the money transfer and initiates a new transaction in the system 10.

In step 42, the sender is prompted for a selectable level of security associated with the money transfer. In some embodiments, the sender is prompted via the send computer 12 to select the level of security, either via the sender interface 22 or through an agent at the send location 14. In other embodiments, the sender selects the level of security in the send request that is provided to the server 20 in step 40. The sender is provided with a list of security inputs that are required to be provided by the receiver at the receive location 18 when the money transfer is redeemed. The sender may select as many security inputs as desired to provide the desired level of security. The varying levels of security correspond to the type and number of security inputs the sender selects. For example, the list of security inputs may include an option to have the receiver input a personal identification number (PIN) at the receive location. In some embodiments, the sender interface 22 includes a numeric keypad that allows the sender to submit the PIN to be entered by the receiver without intervention or assistance from the agent at the send location 14. In this case, the PIN may not viewable or accessible by the agent at the send computer 12.

As another example, the list of security inputs may include an option to have the receiver provide one or more elements of personal identification at the receive location. In some embodiments, the personal identification may include a photograph identification that the agent at the receive location 18 matches to the receiver of the money transfer. In other embodiments, the personal identification may include a data encoded identification, such as a driver's license, credit card, or government issued identification (e.g., passport) that includes a magnetic strip or other means for storing identifying data about the receiver.

As a further example, the list of security inputs may include an option to have the receiver provide a biometric identification at the receive location. In this case, the receiver has provided biometric identification information to the system 10 prior to the sender submitting the money transfer send request in step 40 (i.e., the receiver's biometric information is stored in the server 20 when the sender submits a send request).

The selected level of security is then sent to the server 20 and associated with the send request information. The server 20 may review the information to assure that the transaction is valid and the information is verifiable and complete. Then, in step 44, information about the money transfer is stored with the selected level of security in the server 20. The server 20 may also provide a reference number for the transaction to the send computer 12 to be provided to the sender.

In some cases, the agent at the send location 14 may determine that the information supplied by the sender is suspicious, or that characteristics of the transaction match those of known types of fraudulent transactions. To address this, in optional decision step 46, the agent at the send location 12 may be given authority to determine if the level of security selected by the sender is satisfactory for the conditions and characteristics of the transaction. For example, the agent at the send location 14 may determine that the send transaction has characteristics similar to a "grandparent fraud" type of transaction, in which a relative of the sender is impersonated to deceive the sender into sending a money transfer to the impersonator. In such instances, if the agent determines that more security inputs should be required of the receiver at the receive location 18, then in optional step 48, the agent overrides the level of security selected by the sender with a higher level of security. For example, the agent may set the level of security to require one or more additional sources of identification or other security inputs from the receiver to receive the money transfer. The higher level of security is then stored in the server 20 with information related to the money transfer in step 44. In an alternative embodiment, the system 10 automatically overrides the level of security selected by the sender if certain send transaction criteria are met. On the other hand, if, in decision step 46, the agent determines that the level of security selected by the sender is satisfactory for the conditions, then, in step 44, the level of security selected by the sender is stored in the server 20 with information related to the money transfer.

After the money transfer and associated level of security are stored in the server 20, the money transfer is available (either immediately or after a grace period of time) for receipt. As discussed above, while a single receive location 18 is shown, the system 10 includes a plurality of geographically dispersed receive locations 18. In step 50, the server 20 receives a request to receive the money transfer via a receive computer 16 at one of the receive locations 18 in the system 10. The receive request may include information such as identifying information about the receiver, the amount of the money transfer, and/or the reference number provided by the server 20 when the money transfer was sent. When the server 20 receives the receive request, the server 20 finds the money transfer record based on the information supplied in the receive request.

When the reference number is required for an acceptable receive request, only the record associated with the reference number is retrieved from the server 20. This prevents multiple open transactions associated with the receiver's name or other identification from being displayed at the receive location 18, which prevents the receive agent from accessing other records.

When the server 20 has retrieved the money transfer record, in step 52, the server 20 sends a command to the receive computer 16 to prompt the receiver for the security inputs set by the sender. In alternative embodiments, the server 20 sends the money transfer record to the receive computer 16, which determines the security inputs associated with the money transfer and prompts the receiver for the security inputs. The receiver may be asked to supply the security inputs directly via the receiver interface 24, or the receiver may supply the security inputs through an agent operating the receive computer 16. For example, if the prompted security inputs include a PIN, the receiver interface 24 may include a numeric keypad for the receiver to enter the PIN. As another example, if the security inputs include a data encoded identification, the receiver interface 24 may include a reader for accessing the data encoded on the identification (e.g., a magnetic stripe reader). As a further example, if the security inputs include biometric information from the receiver, the receiver interface 24 may include a biometric reader/scanner, such as a fingerprint reader, face scanner, or iris scanner.

In step 54, the security input(s) received from the receiver of the money transfer are received by the server 20 from the receive computer 16. Then, in decision step 56, the server 20 determines whether the received security inputs are valid by comparing them to information stored with the money transfer record. In an alternative embodiment, the receive computer 16 receives the security inputs and compares them to the selected security inputs associated with the money transfer record. For example, if the security inputs include information from a data encoded identification, the name, address, and other information retrieved from the data encoded identification is compared with the receiver information provided by the sender in step 40. As another example, if the security inputs include receiver biometric information, the biometric information supplied to the receiver interface 24 is compared to receiver biometric information stored in the server 10.

If, in decision step 56, any of the security inputs supplied by the receiver are not authenticated or does not match the information supplied by the sender, then, in step 58, the server 20 rejects the receive transaction request and declines the release of funds to the receiver. The receiver may then be given an opportunity to supply correct security inputs to complete the transaction. Alternatively, if the receiver fails to supply the correct security inputs after one or more attempts, the server 20 may freeze the money transfer and prevent it from being received until further action is taken (e.g., approval by the sender).

If, in decision step 56, the server 20 or receive computer 16 authenticates the security inputs received from the receiver, then, in step 60, the server 20 authorizes release of the funds in the send amount. After completion of the receive transaction, the financial services organization may pay the send location 12 and/or the receive location 16 a commission for the money transfer transactions. For example, the financial services organization may pay the send location 12 and/or the receive location 16 a percentage of the money transfer sent and received. The commissions paid by the financial services organization may be included in fees charged to the customer to send and/or receive the money transfer.

Figure 3:
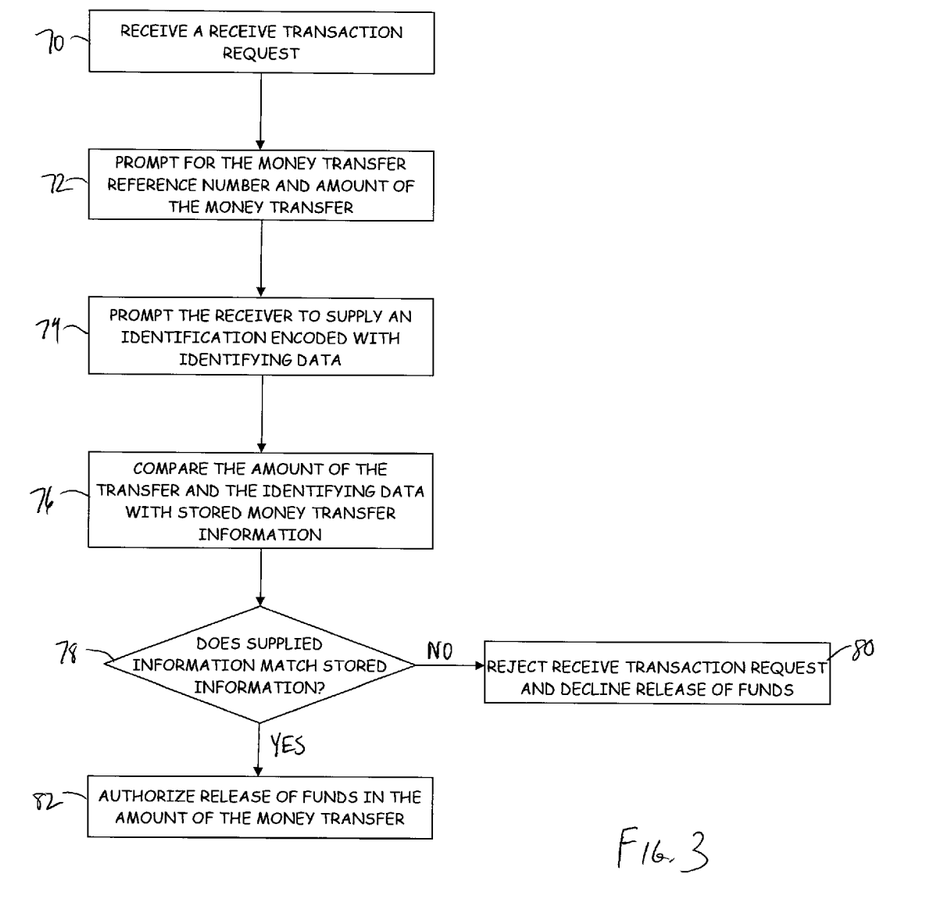
FIG. 3 is a flow diagram of an embodiment of a process for prompting the receiver of a money transfer to supply an identification encoded with identifying data to receive the money transfer.

FIG. 3 is a flow diagram of another embodiment of a process to prevent receive side fraud in the system 10. In particular, FIG. 3 illustrates an embodiment of a process for prompting the receiver of a money transfer to supply an identification encoded with identifying data to receive the money transfer at a receive location 18, particularly an unattended (i.e., no agent) device such as a self-service kiosk or a personal computer. The process illustrated in FIG. 3 assumes that a send request has been provided at a send location 14, and that information associated with the send transaction (i.e., the transaction record), including, but not limited to, sender and receiver identification information, the send amount of the money transfer, and the reference number for the money transfer, have been stored in the server 20.

In step 70, the server 20 or receive computer 16 receives a request to receive the money transfer. In some embodiments, the receive transaction is initiated at the receive computer 16 by the receiver by entering or selecting appropriate options on the receive computer 16. For example, the receive computer 16 may display one or more selectable options that are selectable via the receiver interface 24 (e.g., keyboard, touch screen, etc.) and include the option to receive a money transfer. When the receiver selects the option to receive the money transfer, the receive transaction is initiated.

In step 72, the receiver is then prompted at the receive computer 16 to enter the reference number and the amount of the money transfer via the receiver interface 24. When the reference number is supplied to the receive computer 16, the money transfer is accessed in the server 20 and supplied to the receive computer 16. Then, in step 74, the receiver is prompted to supply a data encoded identification to the receive computer 16. For example, the receiver interface 24 may include a magnetic stripe reader or other device to read information from the data encoded identification. In some embodiments, the data encoded identification includes track 1 information as defined by ISO 7813 from the International Organization for Standardization. The receive computer 16 is configured to extract at least the last name of the receiver from the data encoded identification.

In step 76, the receive computer 16 or the server 20 compares the amount of the money transfer and receiver identification information as accessed from the server 20 with the money transfer amount and identification information supplied by the receiver at the receiver 16. Then, in decision step 78, the receive computer 16 or server 20 determines whether the information provided by the receiver matches the information from the stored money transfer record. In some embodiments, the send amount provided by the receiver matches the stored information only if the entered amount exactly matches the amount from the stored record. In other embodiments, the send amount provided by the receiver matches the stored information if the entered amount is within a tolerance or threshold amount (e.g., $20) of the amount from the stored record. The receive computer 16 or server 20 may also use so-called "close logic" to only require a match of a predetermined portion of the supplied identification information (e.g., first three letters of the last name and first letter of the first name) to verify identification.

If, in decision step 78, either the amount of the money transfer entered by the receiver or the supplied identification does not match the information in the stored money transfer record, then, in step 80, the receive computer 16 or server 20 rejects the receive transaction request and declines the release of funds to the receiver. An error message may also be supplied on the receive computer 16. The receiver may then be given an opportunity to supply correct amount and identification information to complete the transaction. Alternatively, if the receiver fails to supply the correct amount and identification information after one or more attempts, the receive computer 16 or server 20 may freeze the money transfer and prevent it from being received until further action is taken (e.g., approval by the sender and/or the financial services organization).

For example, in some embodiments, the receive computer 16 or server 20 may send a message (e.g., email or SMS) and/or place a telephone call to the sender indicating that information supplied by the receiver does not match the information in the stored money transfer record or that the receiver could not supply the required information. The sender may then be requested to respond to the message or telephone call to decide on the ongoing status of the money transfer. For example, the sender may cancel the money transfer or allow the money transfer to remain open.

On the other hand, if, in decision step 78, the receive computer 16 or server 20 authenticates the money transfer amount and identification information received from the receiver, then, in step 82, the server 20 authorizes release of the funds in the send amount. For example, in embodiments in which the receive computer 16 is a kiosk, funds may be dispensed from the kiosk in the amount of the money transfer. In some embodiments, the funds are dispensed as currency. In other embodiments, the funds are dispensed as a pre-paid card.

Figure 4:
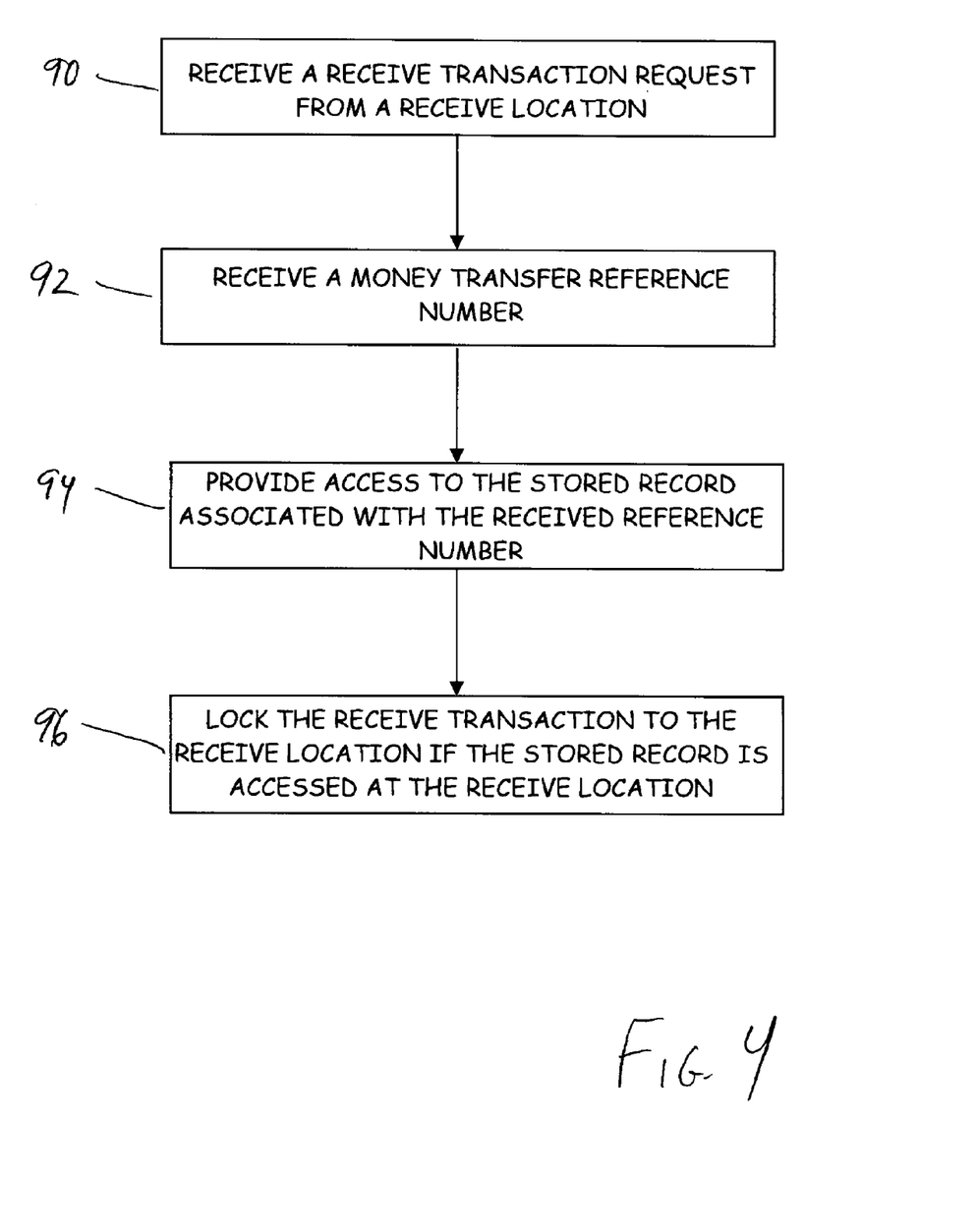
FIG. 4 is a flow diagram of an embodiment of a process for locking a money transfer receive transaction to a receive location when information about the money transfer has been accessed at the receive location.

FIG. 4 is a flow diagram of a further embodiment of a process to prevent receive side fraud in the system 10. Particularly, FIG. 4 is a flow diagram of an embodiment of a process for locking a money transfer receive transaction to a receive location when information about the money transfer has been accessed at the receive location. Again, The process illustrated in FIG. 4 assumes that a send request has been provided at a send location 14, and that information associated with the send transaction, including, but not limited to, sender and receiver identification information, the send amount of the money transfer, and the reference number for the money transfer, have been stored in the server 20.

In step 90, the server 20 or receive computer 16 receives a request to receive the money transfer. The agent at the receive location 18 initiates the receive transaction via the receive computer 16. The receiver then provides information regarding the money transfer to an agent at the receive location. For example, the receiver may go to a receive location 18 and fill out a form or otherwise submit information about the money transfer to the receive agent. The receiver provides the money transfer reference number, the amount of the transfer, and identifying information to the agent to be entered on the receive computer 16. Then, in step 92, the server 20 receives the money transfer reference number and other the information about the money transfer from the receive computer 16.

When the reference number has been received, then, in step 94, the server 20 provides access to the stored money transfer record associated with the received reference number to the receive computer 16. For example, a link to information about the money transfer may be supplied on the receive computer 16, such that the transaction is processed by selecting the link, verifying the identity of the receiver and other information about the money transfer, and dispersing the money transfer funds.

However, one concern with conventional systems is that the agent at the receive location 18 can take the information supplied by the receiver and commit a fraud on sender and/or receiver. Particularly, the receive agent can access the record associated with the money transfer on the receive computer 16, and deceive the receiver into believing that the transaction cannot be processed at that time or that the transaction is otherwise inaccessible on the receive computer 16. Subsequently, the receive agent can send the reference number and other details of the transaction to another agent at another receive location 18, and the other agent can accept the funds and remove the money transfer from the system 10. When the receiver goes to the same receive location 18 as previously visited or another receive location 18, the receiver is told that the money transfer is no longer available because it has been paid.

To counter this fraud, the system 10 is configured such that, when the agent accesses the money transfer record at the receive location 18, the transaction is locked to that receive location 18 and is processed during that visit to the receive location 18. In other words, the agent at the receive location 18 will not be able to close the transaction, and either disperses the funds (if the identity of the receiver and other information about the money transfer is confirmed) or declines the receive request (e.g., if the identity of the receiver is not authenticated). The transaction is not available for access or processing at any other location when the transaction is locked to the receive location 18. If any of the information is not verifiable after the money transfer is accessed (e.g., the receiver name is misspelled in record or the amount requested does not match the record), the record may be closed, but the receiver must return to the same location to receive the money transfer after the unverifiable information has been corrected. At this point, if the receiver wishes to receive the money transfer at a different receive location 18, the receiver may be required to contact the financial services organization to release the location lock from the record.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A method for operating a computer system to prevent fraud in a money transfer receive transaction, the method comprising:
   receiving a send transaction request from a sender via a send computer for a money transfer including a send amount;
   causing a user interface to be provided at the send computer, the user interface prompting the entry via the send computer of a sender selected level of security for the receive transaction, the user interface providing a list of a plurality of security inputs to be supplied by a receiver for redemption of the money transfer;
   receiving via the send computer via the user interface one or more security inputs from the sender selected from the list of the plurality of security inputs;
   storing a send transaction record with the selected one or more security inputs in a server;
   receiving a receive transaction request from the receiver of the money transfer via a receive computer;
   causing a user interface to be provided at the receive computer, the user interface prompting the entry via the receive computer of the stored one or more security inputs for redemption of the money transfer;
   receiving via the receive computer via the user interface one or more security inputs from the receiver in response to the prompting provided by the user interface at the receive computer;
   authenticating the received one or more security inputs against the one or more security inputs of the stored send transaction record; and
   authorizing release of funds in the send amount if the received one or more security inputs are authenticated; and
   denying release of funds if the received one or more security inputs are not authenticated.

2. The method of claim 1, wherein the one or more security inputs comprises at least one of a personal identification number (PIN), a photograph identification, a data encoded identification, and biometric identification.

3. The method of claim 2, wherein prompting the sender to select one or more security inputs comprises:
   prompting for entry of the PIN to be entered by the receiver to redeem the money transfer.

4. The method of claim 2, wherein receiving the one or more security inputs from the receiver comprises:
   prompting the receiver to enter the PIN on a user interface.

5. The method of claim 2, wherein receiving the one or more security inputs from the receiver comprises:
   receiving information encoded on the photograph identification and/or government issued identification.

6. The method of claim 1, wherein receiving a receive transaction request from a receiver of the money transfer comprises:
   receiving a reference number and the send amount associated with the money transfer.

7. The method of claim 1, wherein after the one or more security inputs are received from the sender, the method further comprises:
   receiving information from an agent selecting more or different one or more security inputs than the one or more security inputs selected by the sender.

8. The method of claim 1 and further including sending a message to the sender if the release of funds was denied because the one or more security inputs are not authenticated.

9. The method of claim 1 and further including locking the transaction after receiving the receive transaction request.

10. A system configured to prevent fraud in a money transfer receive transaction, the system comprising:
    a server that communicates with a plurality of computers, the server operable to:
    receive a send transaction request for a money transfer from a sender including a send amount via a send computer;
    cause a user interface at the send computer to provide a list of a plurality of selectable security inputs to be supplied by a receiver for redemption of the money transfer;

receive from the send computer one or more of the plurality of selectable security inputs selected by the sender to be entered for redemption of the money transfer;

store a send transaction record with the selected one or more security inputs;

receive from a receive computer a receive transaction request from a receiver of the money transfer;

cause a user interface at the receive computer to provide a prompt for entry of the stored security inputs;

receive from the receive computer the one or more prompted security inputs from the receiver;

authenticate the received one or more security inputs against the security inputs of the stored transaction record; and authorize release of funds in the send amount if the received one or more security inputs are authenticated; and denying release of funds if the received one or more security inputs are not authenticated.

11. The system of claim 10, wherein the one or more security inputs comprises at least one of a personal identification number (PIN), a photograph identification, a data encoded identification, and biometric identification.

12. The system of claim 11, and further comprising:
a first computer including a user interface on which the receiver enters the PIN.

13. The system of claim 12, and further comprising:
a second computer including a user interface on which the sender enters the PIN to be entered by the receiver on the first computer to redeem the money transfer.

14. The system of claim 11, wherein the server receives the one or more security inputs from the receiver via information encoded on the photograph identification and/or government issued identification.

15. The system of claim 14, and further comprising:
a computer including an identification reader that interfaces with the receiver's photograph identification and/or government issued identification to retrieve the information encoded thereon.

16. The system of claim 10, wherein the server is further operable to receive information from an agent selecting more or different security inputs than the one or more security inputs selected by the sender.

17. The method of claim 10 and further including sending a message to the sender if the release of funds was denied because the one or more security inputs are not authenticated.

18. The method of claim 10 and further including locking the transaction after receiving the receive transaction request.

19. A method for operating a computer system to prevent fraud in a money transfer receive transaction, the method comprising:

receiving from a sender computer and storing at a server a send transaction record including one or more security inputs selected by a sender;

receiving a receive transaction request from a receiver computer for redemption of the money transfer;

retrieving from the server the one or more security inputs selected by a sender for redemption of the money transfer;

transmitting information to the receiver computer requesting the one or more security inputs retrieved from the server;

receiving the one or more security inputs from the receiver computer;

comparing the received one or more security inputs to the security inputs of the stored send transaction record; and transmitting an electronic release approval to the receiver computer to release funds in an amount of the money transfer if the received one or more security inputs correspond to the security inputs of the stored transaction record; and transmitting an electronic release denial to the receiver computer to deny release of funds in an amount of the money transfer if the received one or more security inputs do not correspond to the security inputs of the stored transaction record.

20. The method of claim 19, wherein the one or more security inputs comprises at least one of a personal identification number (PIN), a photograph identification, a data encoded identification, and biometric identification.

21. The method of claim 20, wherein receiving the one or more security inputs from the receiver computer comprises:
receiving the PIN on a user interface associated with the receiver computer.

22. The method of claim 20, wherein receiving the one or more security inputs from the receiver computer comprises:
receiving information encoded on the photograph identification and/or government issued identification via a reader associated with the receiver computer.

23. The method of claim 20, wherein the one or more security inputs for redemption of the money transfer further comprises information from an agent selecting more or different security inputs than the one or more security inputs selected by the sender.

24. The method of claim 20, wherein after the retrieving step, the method further comprises:
locking the money transfer redemption to a receive location of the receiver computer such that the money transfer cannot be redeemed at other receive locations after the information associated with the money transfer has been retrieved from the server.

25. The method of claim 19 and further including sending a message to the sender if the release of funds was denied because the one or more security inputs are not authenticated.

* * * * *